United States Patent
Dahlberg

(10) Patent No.: US 6,463,439 B1
(45) Date of Patent: Oct. 8, 2002

(54) SYSTEM FOR ACCESSING DATABASE TABLES MAPPED INTO MEMORY FOR HIGH PERFORMANCE DATA RETRIEVAL

(75) Inventor: Mikael Dahlberg, Düsseldorf (DE)

(73) Assignee: American Management Systems, Incorporated, Fairfax, VA (US)

( * ) Notice: Subject to any disclaimer, the term of this patent is extended or adjusted under 35 U.S.C. 154(b) by 0 days.

(21) Appl. No.: 09/353,395

(22) Filed: Jul. 15, 1999

(51) Int. Cl.[7] .............................................. G06F 17/30
(52) U.S. Cl. ........................... 707/100; 707/102; 707/1
(58) Field of Search ................................ 707/200, 100, 707/101, 203, 102, 10, 2, 1

(56) References Cited

U.S. PATENT DOCUMENTS

| | | | |
|---|---|---|---|
| 5,603,024 A | 2/1997 | Goldring | 707/203 |
| 5,664,177 A | * 9/1997 | Lowry | 707/100 |
| 5,740,423 A | * 4/1998 | Logan et al. | 707/10 |
| 5,974,407 A | * 10/1999 | Sacks | 707/2 |
| 6,078,923 A | * 6/2000 | Burrows | 707/101 |
| 6,151,604 A | * 11/2000 | Wlaschin et al. | 707/100 |
| 6,208,993 B1 | * 3/2001 | Shadmon | 707/102 |
| 6,243,718 B1 | * 6/2001 | Klein et al. | 707/203 |

OTHER PUBLICATIONS

PCT International Preliminary Examination Report issued by International Preliminary Examining Authority, mailed on Jul. 17, 2001.

M.E. Adiba et al, "Database Snapshots" IBM Research Report, US, San Jose, CA, Mar. 7, 1990, pp. 1–16, XP000747603.

D.G. Severance et al., "Differential files: their application to the maintenance of large databases" ACM Transactions on Database systesm, Sep. 1976, USA vol. 1, No. 3, pp. 256–267, XP002134863.

B. Lindsay et al., "A snapshot differential refresh algorithm" Proceedings of ACM SIGMOD '86 International Conference on Management of Data, Washington, DC USA May 28–30, 1986, vol. 15, No. 2, pp. 53–60, XP002134864.

International Search Report for PCT/US99/16769 filed Jul. 26, 1999.

* cited by examiner

*Primary Examiner*—Sanjiv Shah
(74) *Attorney, Agent, or Firm*—Staas & Halsey LLP

(57) ABSTRACT

A system and method that enables quick access to large volumes of data on a realtime basis and is totally transparent to application programs that use the data. This is accomplished by placing information extracted from the database into a master file stored in a data storage device and then loaded into memory for access by application programs. When information in the database changes the corresponding information is updated using an incremental file and an index file that are then loaded into memory for access by application programs. The master file, index file and incremental file are linked in such as fashion to enable quick access to data desired.

21 Claims, 11 Drawing Sheets

SYSTEM FOR ACCESSING DATABASE TABLES MAPPED INTO MEMORY FOR HIGH PERFORMANCE DATA RETRIEVAL

REFERENCE TO MICROFICHE APPENDIX

A microfiche appendix having 3 microfiche and 216 frames is included herewith and includes a detailed design specification of the present invention.

BACKGROUND OF THE INVENTION

1. Field of the Invention

The present invention is directed to a system for enhancing application processing performance involving read-only access to database tables. More particularly, to a system to enhance execution of complex business transaction applications, such as those performed in telecommunications billing systems, that requires quick access to data stored in a database by placing a portion of the data into RAM memory using a master file and an incremental file.

2. Description of the Related Art

In today's business data processing systems, business data is stored in relational databases. The performance of these relational databases in accessing data is usually adequate to meet most needs. However, for high performance applications the access to data stored in these relational databases turns into a performance bottleneck and hampers quick retrieval. Solutions have been developed in which data is either cached from the database or simply loaded into memory for access. However, these solutions don't provide the combination of the flexibility to extract only the data needed and provide updates of modified data in increments.

This is a particular problem in complex business transactions, like those performed in telecommunications billing systems, require access to data stored in a database to validate business rules or to look up reference data. This type of data is mostly static and is not frequently changed. Database access is often the performance bottleneck for high volume data processing.

Therefore, what is needed is a system and method that allows for quick access to large volumes of static data on a realtime basis and is totally transparent to application programs. In addition, when data changes in a database a method and system is needed to notify application programs of the change and have them access the most up-to-date data.

SUMMARY OF THE INVENTION

It is an object of the present invention to reduce database bottlenecks seen by business application programs, by providing fast read-only access to data extracted from a database and loaded in memory.

It is also an object of the present invention to provide a method of accessing a database by placing information extracted from the database into a first data structure in memory. Then the present invention updates the information in memory periodically or when requested when a change in the information occurs in the database by placing the updated information into a second data structure in memory which is linked to the first data structure.

It is a further object of the present invention to seamlessly update data in memory provided to the applications to reflect changes in the database.

It is another object of the present invention to provide significant performance improvement over that seen in direct database access.

It is also an object of the present invention to provide a standard interface for application programs to database data.

The above objects can be attained by a system and method that partially or fully extracts data from a database and places the data in RAM for access by application programs. Further, the foregoing objects can be attained by a system and method that updates data in RAM (random access memory), transparent to the application programs, whenever the data changes in the database.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
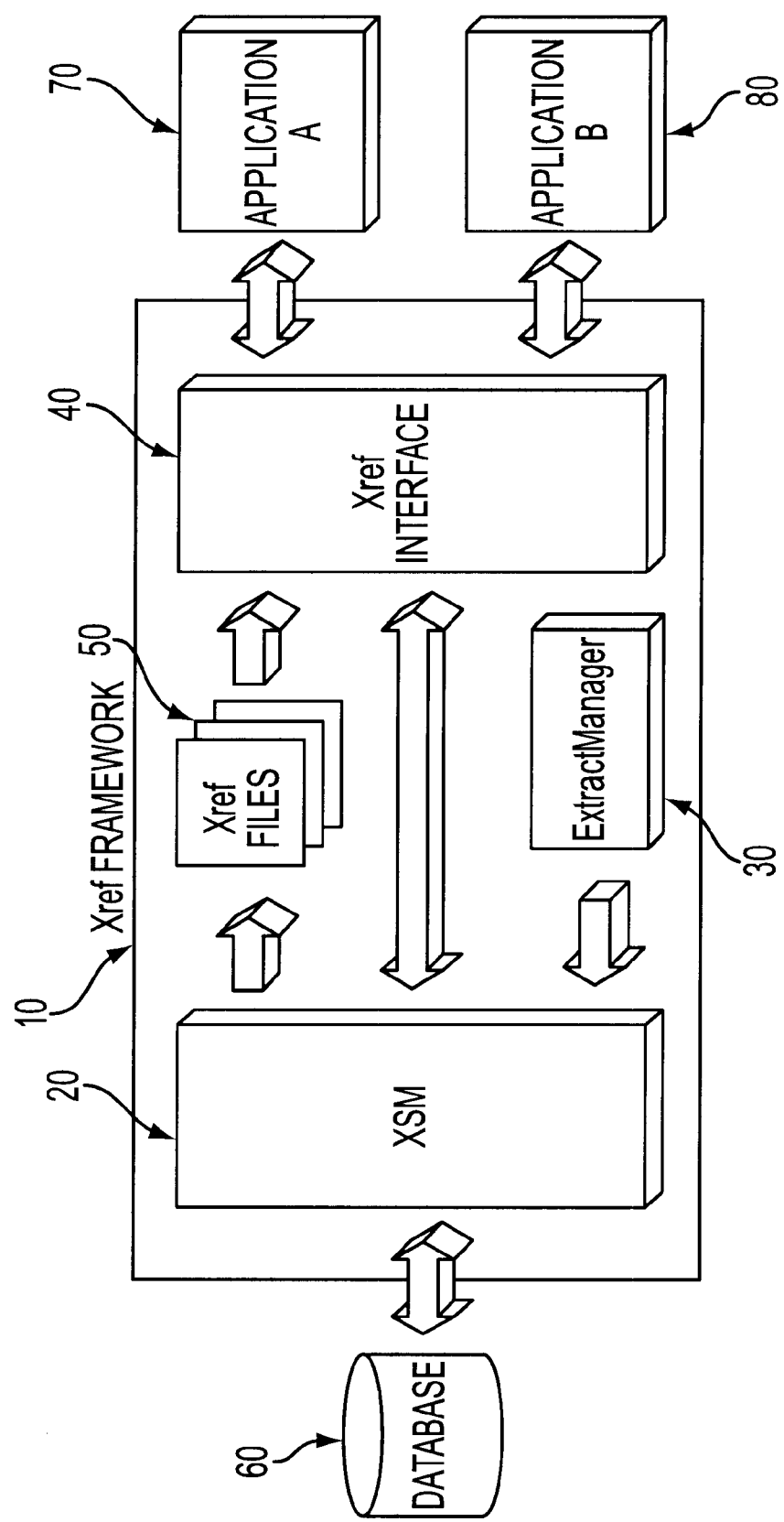
FIG. 1 is an overall modular configuration of the present invention.

FIG. 1 is an overall modular configuration of the present invention illustrating the major modular components thereof.

Referring to FIG. 1, Xref Framework 10 has three fundamental modules including: Xref Storage Manager 20 (XSM 20); ExtractManager 30; and the Xref Interface 40. Each of these modules will be discussed in detail below.

Xref Storage Manager XSM-20

Still referring to FIG. 1, the XSM 20 module is used to extract the information stored in database 60 and transfer it to Xref files 50. Xref files 50 comprise several standard flat files. A flat file is sequential file of a single record type with no linked structures or direct record access capability. Each Xref file 50 contains only entries (possibly converted) returned by a system query language ("SQL") select statement as configured for the database 60. This provides the ability to produce a partial and or a full database extraction based on business needs. Application 70 and application 80 are notified when full extracts or updates are available by XSM 20. Applications 70 and 80 utilize the high performance access to data provided by the Xref Framework 1 0 for the specific business process that they perform. An example of such a business process where performance is essential is rating and billing of large telecommunication customer accounts. XSM 20 is able to extract incremental updates from database 60 and place them into separate update files which are part of the Xref Files 50. These incremental updates contain information for rows in the database 60 that have been changed, added or deleted since the last full extraction of the database 60. The incremental extraction is needed because full extraction is a slow process and it would introduce a performance problem to force the applications 70 and 80 using the Xref Interface 40 to reload a new version of the full extracted Xref files 50 for each new extraction. The applications 70 and 80 are notified as soon as an incremental update is available by XSM 20 sending a message to the Xref interface 40.

ExtractManager-30

Still referring to FIG. 1, ExtractManager 30 is a module that sends messages to the XSM 20 and tells XSM 20 which database 60 table(s) to extract and whether to perform a full or incremental extraction. The ExtractManager 30 is run periodically to send a message to XSM 20 requesting XSM 20 to create incremental extracts. This ensures that applications 70 and 80 using extracted data, are provided with updates at periodic intervals.

Xref Interface-40

Still referring to FIG. 1, Xref Interface 40 is the part of the framework used by applications to manage and access data stored in Xref files 50. The Xref Interface 40 manages the mapping of Xref files 50 to memory and handles access of incremental updates, transparent to applications 70 and 80. Memory (not shown) storing the Xref data extracted from database 60 is shared by applications 70 and 80 to improve performance and save resources. Xref Interface 40 provides several different access methods to query data, as well as methods for stepping through some or all entries. The queries supported are: searching for a certain entries using a key; searching for the best matching entry using a key; searching using a key and an effective date. Also supported is stepping through some or all entries in the order provided in the Xref Files 50 starting at the entry returned by a query with respect to incremental updates and effective date.

Figure 2:
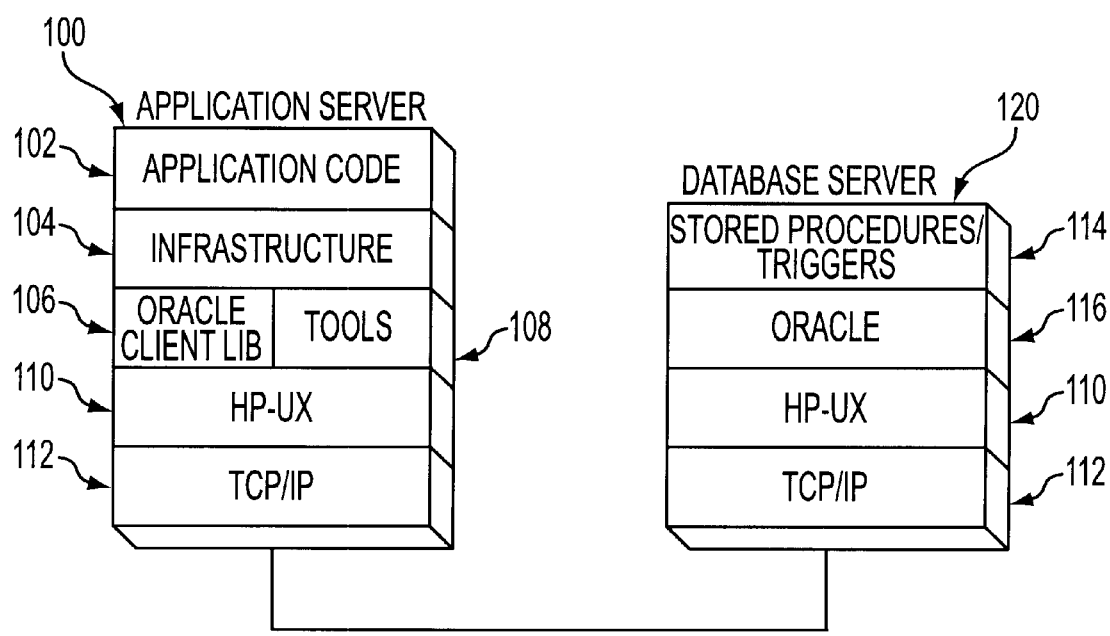
FIG. 2 is an overall hardware and software layer configuration of the present invention.
Figure 3:
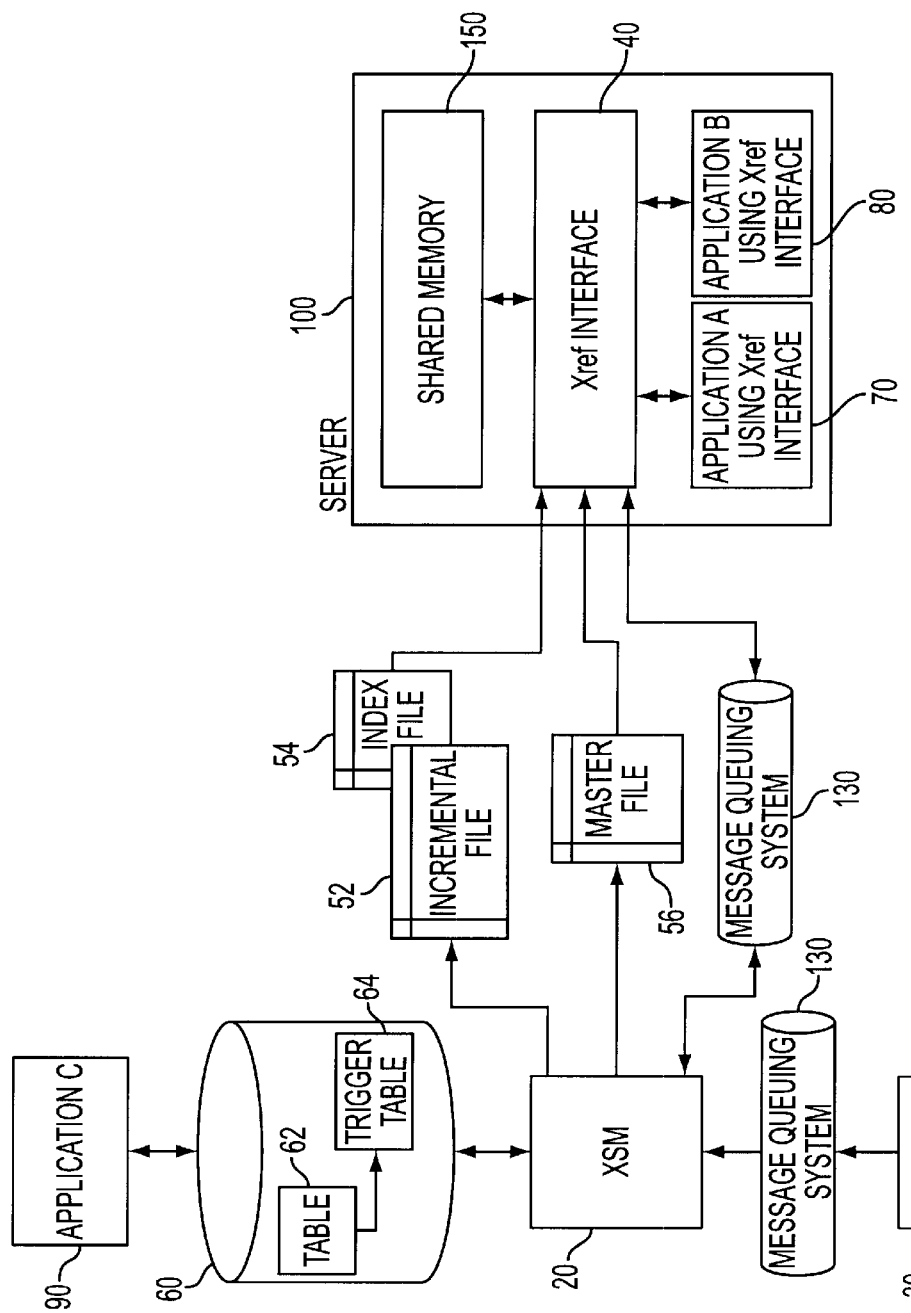
FIG. 3 is a data flow diagram of the present invention.

FIG. 2 is an overall hardware and software layer configuration of the present invention. As shown in FIG. 2, the present invention is implemented in a distributed client server system format comprising an application server 100 and a database server NF, 120. The application server 100 is implemented using application code 102 (C++ programming language) running on a HP-UNIX 110 platform. The application server 100 also uses an Oracle database 106 to store persistent objects. XSM 20, ExtractManager 30 and applications 70 and 80 using the Xref Interface 40 reside on the application server 100. The Xref Framework 10 uses the Oracle client libraries to access the database server 120. The Xref Framework 10 components communicate using an asynchronous message queuing system, see 130 FIG. 3, provided by the infrastructure 104. The de-coupling of the Xref components using queues allows distributed deployment and flexible configuration of the system.

The database server 120 hosts the Oracle database 116 running on a HP_UNIX 110 platform. The Xref Framework 10 uses Oracle database 114 triggers to identify data to be included in incremental updates.

As would be appreciated by a person of ordinary skill in the art any suitable general purpose computer, programming language and database may be used to implement the present invention.

FIG. 3 is a data flow diagram of the present invention. The XSM 20 is started and sends a broadcast message to all applications 70 and 80 announcing its availability via queue 130. Applications 70 and 80 send a registration message to XSM 20 via Xref Interface 40 and message queuing system 130 to indicate which database tables 62 they want to use. The ExtractManager 30 is started and sends a message using the message queuing system 130 to XSM 20 to generate a full extraction of one or multiple tables 62 in database 60. Database 60 contains table 62 and trigger table 64.

When XSM 20 receives the message from the message queuing system 130 to perform a full extraction, XSM 20 executes a query to retrieve all data from table 62 and writes the information to the Xref master file 56. When the extraction process has finished, XSM 20 sends a message using the message queuing system 130, to all registered applications 70 and 80 interested in the extracted table, to announce that a full extraction is ready for use. Application 70 uses the Xref Interface 40 to load the data into shared memory 150 from master file 56 and also to access the data through the Xref Interface 40 from shared memory 150. If application 80 is interested in the same data as used by application 70 and both processes reside on the same application server 100, as shown in FIG. 2, the Xref Interface 40 will share the memory 150 already used by Application 70. The sharing of memory saves important resources and improves performance since the data only needs to be loaded to memory once.

Still referring to FIG. 3, application 90 modifies the data in the table 62 that was extracted earlier. This change in table 62 causes database triggers 114, shown in FIG. 2, to be executed in database 60. The database triggers 114 then copy the modified data to the trigger table 64 and mark it with a time stamp, sequence number and a type code for the modification. The ExtractManager 30 is executed periodically and sends a message using the message queuing system 130 instructing XSM 20 to create an incremental extraction. XSM 20 scans the corresponding trigger table 64 for rows that have not been included in the last full extraction. This is determined using the time stamp on each row. XSM 20 uses this data to create an incremental file 52 and an index file 54. XSM 20 then sends a notification message to all registered applications 70 and 80 using the message queuing system 130, announcing that a new incremental update is available. After receiving the notification message, the Xref Interface 40 is used by application 70 and 80 to load the incremental file 52 and the index file 54 into shared memory 150. Applications 70 and 80 are now provided with the updated information. This processing is transparent to the application logic of application 70 and 80. Once either application 70 or 80 terminate or are no longer interested in Xref data, application 70 or 80 send a message to XSM 20 to using the message queuing system 130. XSM 20 will not send further update messages to applications 70 or 80.

Full Extraction

Still referring to FIG. 3, the XSM 20 provides the capability of creating full database extractions and saving the extracted information to a Xref master file 56. For each database table 62, a SQL select statement can be created for the extraction process. This provides the ability to do a partial or a full database extraction based on business needs. Creating a full extraction of a large table is processor intensive. Full table extractions need to be created in two situations. First, upon start up of the system, the Xref files 50 must be created. Second, when incremental update information reaches such a volume that the application accessing the data is noticeably slowed. This process is usually executed outside heavy load operating hours to avoid disturbing other applications utilizing the database. When creating a full extract, the rows in the trigger table 64 can either be deleted or kept to provide the history of modifications applied to the table 60. In the case where the rows in the trigger table 64 are kept, the rows need to be marked so that they are not included in the next incremental extract. This marking can either be achieved by adding an additional column to the trigger table 64 in order to mark rows or to use a time stamp on each row to identify the updates that were performed after the last full extract took place. The description that is provided herein utilizes a time stamp for this purpose.

Figure 4:
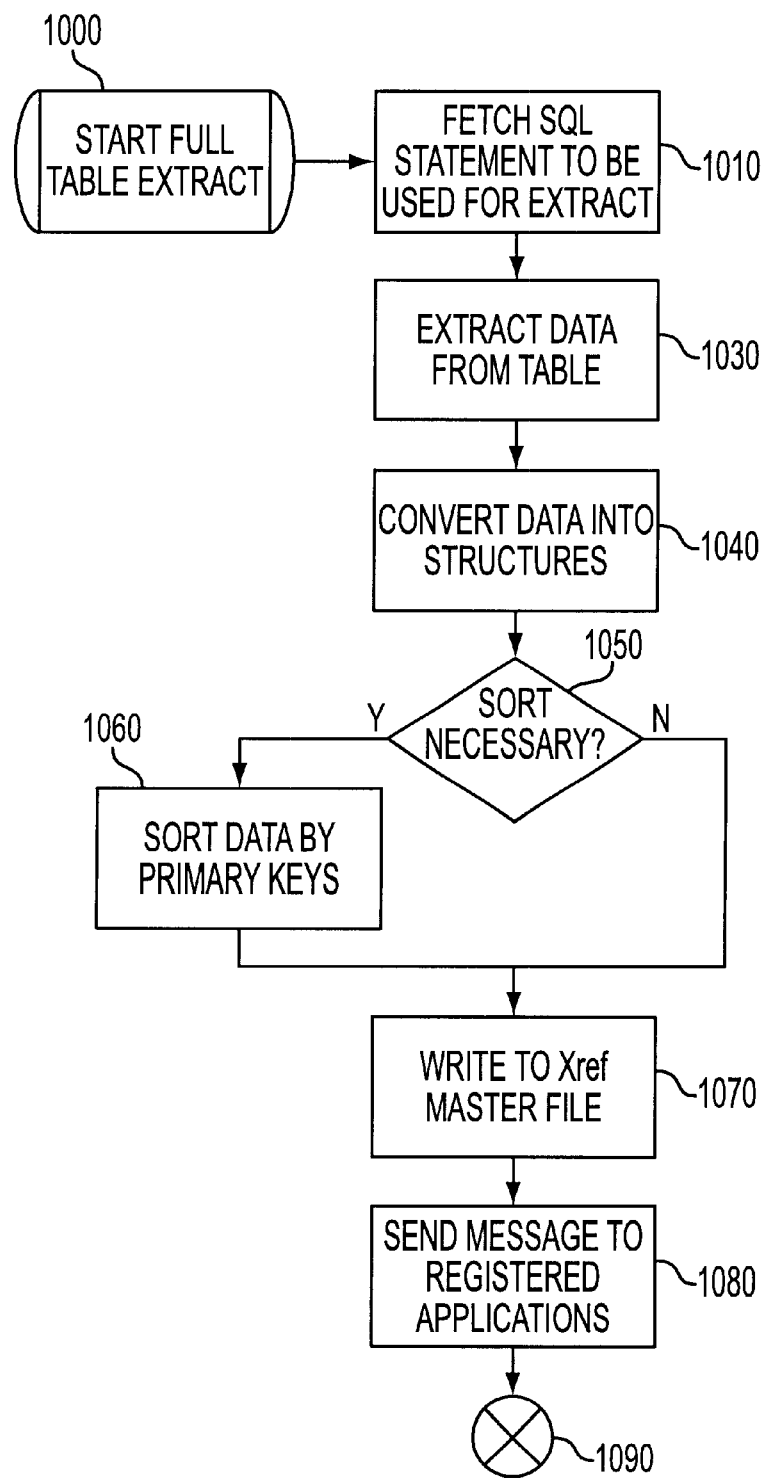
FIG. 4 is a flowchart of the algorithm to create full extractions in the present invention.

FIG. 4 is a flowchart of the algorithm used to create full extractions in the present invention. Once a request for a full database extraction is received, the extraction process starts by initiating XSM 20, shown in FIG. 1, in operation 1000 of FIG. 4. In FIG. 4, XSM 20 starts by retrieving 1010 the SQL select statement configured for the table to be extracted. This provides the flexibility to only extract the data required for the business process and helps to save resources.

Still referring to FIG. 4, XSM 20 now extracts all the data in the database table using the created SQL select statement in operation 1030. If other applications are allowed to update the table while the extraction is in process, it is possible that the trigger table 64 will contain entries that are also contained in the full extraction. These additional entries are filtered out when generating an incremental extraction. In operation 1040, the extracted data is converted into structures in memory 150 and data conversion is performed if necessary. The data structures are the data containers in memory 150 where the data is accessed. This provides a mechanism to have different data representations in applications using the database 60 and applications 70 and 80 using the present invention. In operation 1050, a determination is made whether data conversion or custom order requirements should take place. If such data conversion or customs order requirements are necessary, then in operation 1060 the data conversion or order (sorting) requirements take place. This also allows applications 70 and 80, using the present invention, to use different primary keys or ordering rules than those defined in the database 60.

Still referring to FIG. 4, in operation 1070 the sorted data is written to the Xref master file 56 shown in FIG. 3. XSM 20 then sends a message to all registered applications 70 and 80, shown in FIG. 3, announcing the availability of a new full table extract as shown in operation 1080. Processing then terminates for full extracts in operation 1090.

Incremental Extracts

Referring to FIG. 3, incremental extractions can be used to reduce the time spent extracting Xref data from the database 60. Instead of extracting the whole table, only the information that has changed since the last full extraction is extracted. This also improves application performance as the incremental file 52 can be loaded into shared memory 150 independent of the master file 56. Incremental extraction takes less time and the applications, 70 and 80, using the Xref Interface 40 will only need to reload the updated information. As disk access is slow relative to RAM memory access, this is a major performance advantage. XSM 20 is able to extract incremental updates into separate files 52, 54. The incremental updates contain information for rows in the table 62 that have been changed, added or deleted since the last full extraction of the table 62. The Xref Interface 40 provides a completely transparent interface to the incremental information and an application 70 or 80 using a Xref table will not know if it is receiving an entry from the full extraction or from the incremental extraction. In this way incremental updates can be switched on or off for individual database tables 60 without having any impact on the applications 70 or 80 using those tables 60. For further performance tuning, the master file 56 and the incremental file 54 can be merged periodically. This keeps the size of the incremental file small, which in turn increases the access performance and avoids the need to perform performance intensive full extractions.

Identifying Incremental Information

Referring to FIG. 3, to be able to create incremental file 52 containing only the modifications performed since the last full extraction, the modified information must be tagged. This implementation uses trigger table 64 for this purpose. On each update to the database table 62, the information about the modification is stored in the trigger table 64 using the database triggers. The trigger table 64 contains the complete row data, a field used to distinguish between insertions, updates and deletions and a sequence number that is needed to keep the database operations in a consistent order. The database trigger (not shown) provides the necessary logic for generating the sequence number. XSM 20 uses the primary key, see 641 in FIG. 10 and 561 in FIG. 5, to link entries in the trigger table 64 to entries in the master file 56 when performing an incremental extract. If a field that is a part of the primary key is updated in a row, XSM 20 cannot link the trigger table 64 entry (new key) to the master file 56 entry (old key), because the old primary key is not stored in the trigger table 64. For this reason all updates involving primary key modifications must be carried out in two operations. The first operation is to delete the old row and the second is to insert the updated row into the table. An alternative solution is to keep the old primary key and the new primary key in the trigger table.

Figure 10:
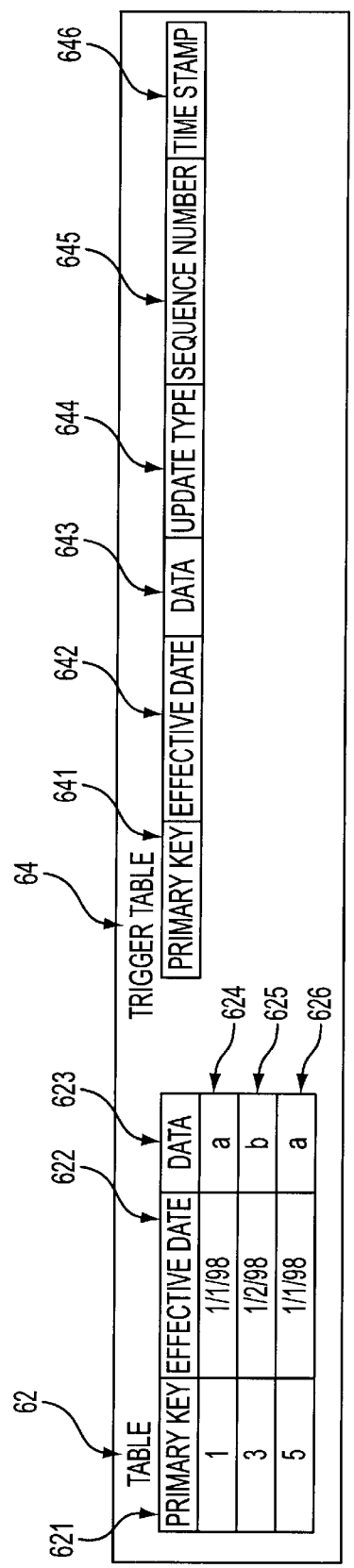
FIG. 10 is an example identifying incremental information using a database table and a trigger table in the present invention.

An example of identifying incremental information is provided in FIG. 10. FIG. 10 depicts an example where table 62, shown in FIG. 3, contains business data and trigger table 64, shown in FIG. 3, that is used to capture the data that needs to be included in incremental updates. In this example, table 62 is initially filled with three data rows 624, 625 and 626. The trigger table 64 is initially empty. In this example, the table 62 contains effective dated data. This means that for a particular primary key multiple entries can exist over time. For processing only the entry active on the processing date is considered.

Referring to FIG. 10, the table 62 comprises three items, First, the primary key column 621 used to identify logical objects. Second, the effective date column 622 used to specify the date when a particular entry is active. Third, the data column 623 that contains the business data contained in the row.

Still referring to FIG. 10, the trigger table 64 consists of six columns. The first three columns 641, 642 and 643 replicate the data of columns 621, 622 and 623 in table 62. The update type 644 column is used to distinguish between insertions, updates and deletions. The sequence number column 645 is needed to keep database operation in a consistent order. The time stamp column 646 is used to determine whether trigger table entries have been included in the last full extract when performing a full extract.

Figure 5:
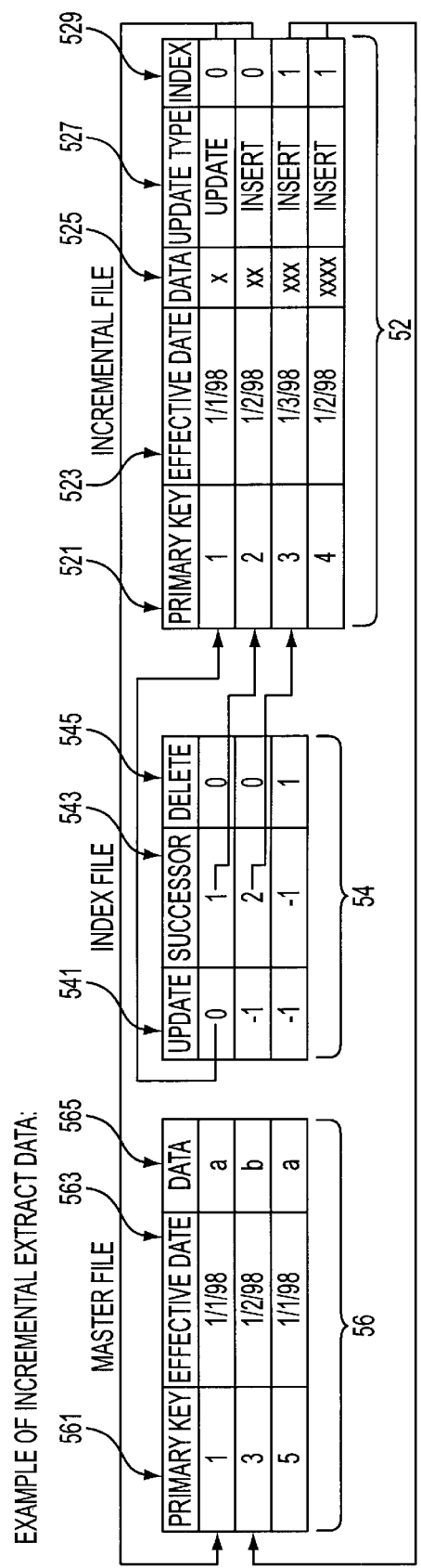
FIG. 5 is a diagram depicting an example of the full and incremental extraction of data in the present invention.

Starting with this data scenario shown in FIG. 10 a full extract is created of the table 62. The master file 56 contains the data as depicted in FIG. 5, discussed in detail below. The master file 56, shown in FIG. 5, comprises the three fields 561, 563, 565 containing the data of columns 621, 622 and 623 in table 62.

After the initial full extract is performed, one or multiple applications 90, as shown in FIG. 3, modify table 62 containing the business data. Each modification fires database triggers that write the information about the modification to the trigger table 64.

Figure 11:
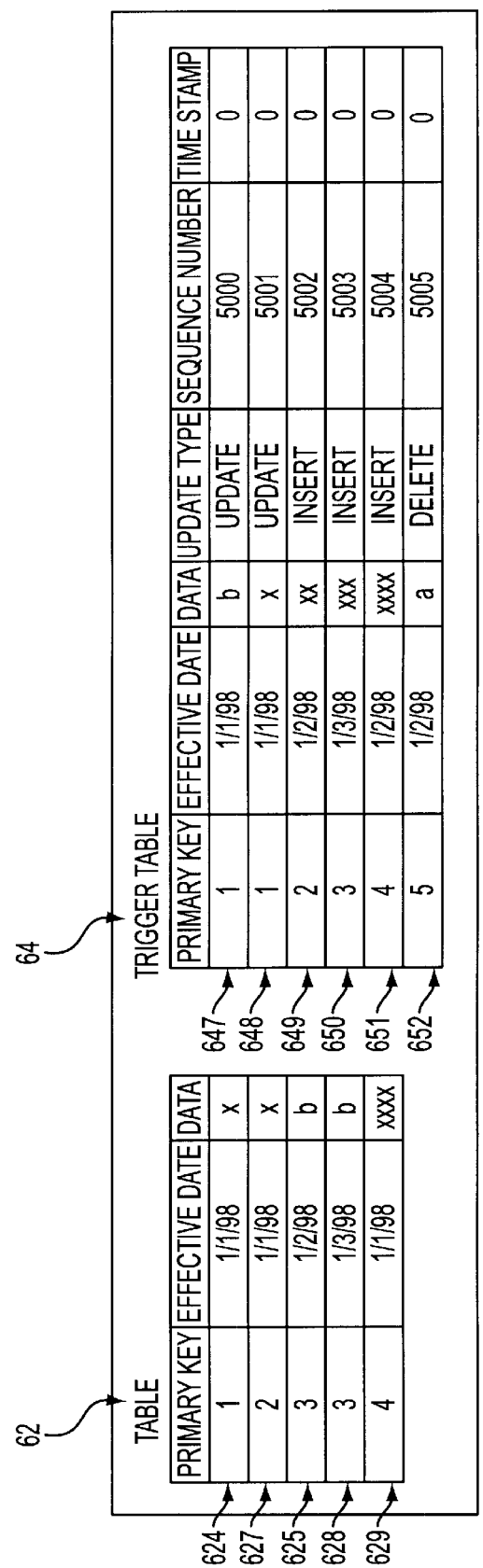
FIG. 11 further illustrates the example shown in FIG. 10.

Referring to FIG. 11 for this example, the following events discussed below take place.

1. The data in the row 624 with the primary key 1 gets updated to 'b'. This event gets marked in the trigger table as row 647 with the sequence number 5000 shown in FIG. 11.
2. The data in the row 624 with the primary key 1 is updated again, this time to 'x'. This event is marked in the trigger table as row 648 with the sequence number 5001. Now two entries, 647 and 648, exist in the trigger table for the primary key 1. Since only the entry with the largest sequence number 648 for the primary key 1 will get processed the first update 647 will be ignored when performing an incremental extraction.
3. A row 627 with a primary key of 2 is inserted.

This event is marked in the trigger table as row 649 with the sequence number 5002 in FIG. 11.

4. A new effective dated entry 628 is inserted for the row with the primary key 3. This event is marked in the trigger table as row 650 with the sequence number 5003 in FIG. 11.
5. A row 629 with a primary key of 4 gets inserted.

This event gets marked in the trigger table as row 651 with the sequence number 5004 in FIG. 11.

6. The row 626 with a primary key of 5 is deleted. This event is marked in the trigger table as row 652 with the sequence number 5005 in FIG. 11.
7. After all these events have taken place the tables contain the data as depicted in FIG. 11.

Starting with this data scenario an incremental extract is created of table 62. The incremental file 52 and the index file 54 contain the data as depicted in FIG. 5. The incremental file 52 a , layout contains the three fields 521, 523, 525 containing the data of the columns 641, 642 and 643 in trigger table 64.

Extracting Incremental Information

Still referring to FIG. 3, XSM 20 uses the trigger table 64 to identify the rows in the database 60 that have been altered since the last full extraction. The ExtractManager 30 is executed periodically and sends a message to XSM 20 requesting a new incremental extract using the message queuing system 130. This ensures that applications are provided with up-to-date data without continuously accessing the database. XSM 20 only reads the rows that have not been included in the last full extract, this is determined using the time stamp on each row. When XSM 20 extracts the rows from the trigger table 64, the entries are ordered by primary key and sequence number. By sorting according to primary key and sequence number, all entries with the same primary key are grouped together and all but the last one (with the largest sequence-number) are disregarded. Only the entry for a primary key with the largest sequence number is used, as discussed above, since all other entries represent outdated entries that have been superceded by updated higher sequence numbers.

Storing Incremental Information

Incremental information is stored in a separate file called the incremental file 52 shown in FIGS. 3 and 5. The reason for use of a separate file is it is not possible to extend the master file without forcing all applications 70 and 80 using it to first unload the old version and then load the new version which would have a negative performance impact on the applications. The incremental file 52 shown in FIG. 5 only contains the inserted/updated rows (deleted rows are managed using the Index file), and additional information needed for quick access of incremental data.

The incremental file 52, shown in FIGS. 3 and 5, is created by the XSM 20 shown in FIG. 3. Referring to FIG. 5, in addition to a copy of the fields 525 from the inserted or updated rows, two additional fields are stored in the incremental file. The first is the update type field 527 that contains the update type code which can be either 'U' (pdated), 'I'(nserted) or 'D'(eleted). When processing the incremental information extracted from the database 60, the XSM 20 searches the master file 56 for the updated entry to determine how the row should be stored in the incremental file 52. Depending upon the type of update and if the entry can be found in the master file 56, the update type 527 is transformed as provided in the following table.

| Update | Exists in Master File | Action to be Taken |
| --- | --- | --- |
| Insert | Yes | Transform into |
| Insert | No | Keep as 'Insert' |
| Update | Yes | Keep as 'Update' |
| Update | No | Transform into |
| Delete | Yes | Keep as 'Delete' |
| Delete | No | Ignore |

Still referring to FIG. 5, the second field in the incremental file 52 is the index field 529 that is an index to predecessor row in the master file 56. For updated rows the index is the row number in the master file 56 for the updated entry. For inserted rows, the index field 529 is the row number for the last entry in the master file 56 that has a primary key 561 with a value less than the inserted row (i.e. the row 'preceding' the inserted one). It is possible for several entries in the incremental file 52 to have the same index 529 in the case that they are all successors to the same entry in the master file 56.

When the XSM 20, shown in FIG. 3, is done creating the incremental file 52, it will create an index file 54 shown in FIGS. 3 and 5. Referring to FIG. 5, the index file 54 provides information about deleted rows and a reference to quickly find inserted or updated entries in the incremental file 52 from the master file 56. Each row in the master file 56 has a corresponding row in the index file 54. The index file 54 has three fields: deleted 545; updated 541, and successor 543. The deleted 545 field is a flag indicating if the corresponding row in the master file 56 has been deleted. The updated 541 field is an index to the incremental file 52. In this case, a row in the master file 56 has been updated, the corresponding row in the index file 54 will have the update 541 field set to the index of the corresponding entry in the incremental file 52 for the updated version of the row. The successor field 543 is used in the case when an insert has been made. Upon an insertion, the successor field 543 will then contain the index of the first inserted successor in the incremental file 52 of the corresponding row in the master file 56. It should be noted that this can be either a later effective date version for the same primary key 561 or a row with a primary key value that is larger than the value for the primary key of the row in the master file 56. A value −1 is used in the successor 543 field of the index file 54 for non-valid entries (i.e., to indicate that the row has not been updated or does not have any successors).

Still referring to FIG. 5, in this example the first row in the master file 56 has been updated which is the first row in the incremental file 52. However, the first row in the master file 56 also has a successor which is the second row in the incremental file 52. The successor has a primary key 561 value that is greater than the value for the row in the master file 56. The second row in the master file 56 has two successors as shown in the incremental file 52. The first one is an effective-date-successor that has the same primary key 561 equal to the value 3 as the row in the master file 56 but a different effective date 563 of Jan. 3, 1998 as shown in the incremental file 52. The second successor in the incremental file 52 has a primary key 521 equal to the value 4 which is greater than the row in the master file 56. These two successors share the same predecessor entry in the index file 54 and they therefore will have the same index value of 1. The third entry in the master file 56 has been deleted as indicated in the index file 54 column 545.

Figure 6:
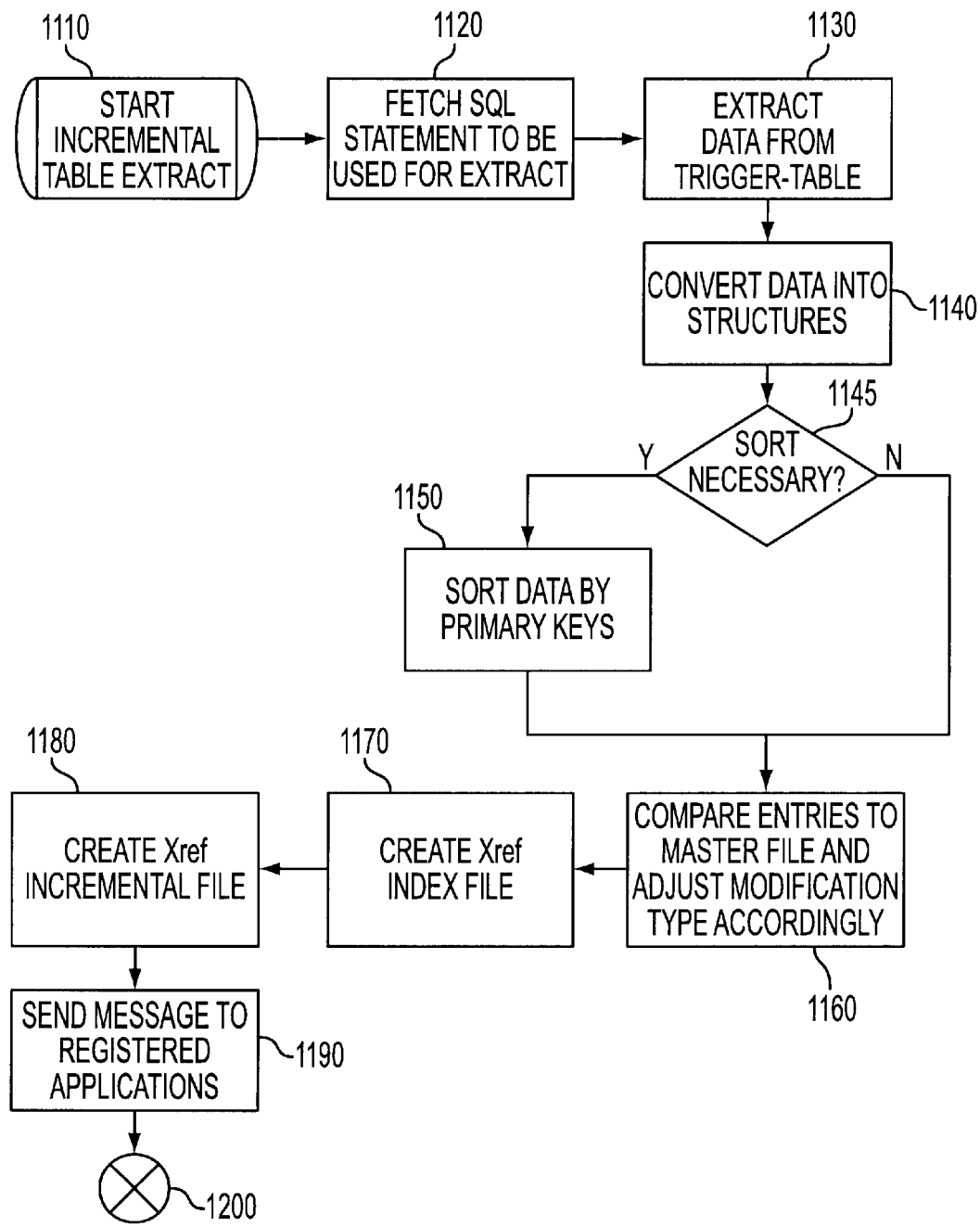
FIG. 6 is a flowchart of the algorithm used to create incremental extractions in the present invention.

FIG. 6 is a flowchart of the algorithm used to create incremental extractions in the present invention. The algorithm shown in FIG. 6 is used by XSM 20 to create an incremental extraction from database 60. This incremental extraction, combined with the previously extracted master file 56, is used to provide applications 70 and 80 using the Xref Interface 40 with the most up-to-date information.

Referring to FIG. 6, the XSM 20, shown in FIG. 3, is started in order to execute an incremental table extraction in operation 1110. In operation 1120, the XSM 20 starts by retrieving the SQL select statement configured for table 62, shown in FIG. 3, to be extracted. This provides the flexibility to only extract the data required for the business process and help to reduce resources required. In operation 1130, the XSM 20 extracts the data in the trigger table 64, that has not been included in the last full extract, using the configured SQL select statement from operation 1120. The time stamp on each row is used to determine whether the row has been included in the last full extract. In operation 1140, the extracted data is converted into structures in memory and data conversion is performed if necessary. This provides a mechanism to have different data representations in applications using the database and applications using the present invention. Data conversion or custom order requirements can make it necessary to sort the data at this point and this determination that sorting is required is made in operation 1145. If sorting is required this is done in operation 1150. This also allows applications 70 and 80 to use different primary keys or ordering rules than those defined in the database. In operation 1160, XSM 20 compares the sorted entries to entries in the master file 56, shown in FIG. 3. In this operation it is determined whether trigger table 64 entries represent update, insert or delete operations. If multiple entries for one primary key exist in trigger table 64, only the entry with the highest sequence number is considered. Only the entry for a primary key with the largest sequence number is used since all other entries represent outdated entries that have been superceded by updated with higher sequence numbers. XSM 20 determines the index 529 for each entry in incremental file 52 and maintains a list for all index 529 entries. In operation 1170, the index 529 information is now written to index file 54. In operation 1180, the sorted and filtered data is now written to the incremental file 52. Then in operation 1190, XSM 20 sends a message to all registered applications 70 and 80 announcing the availability of a new incremental update information. Finally, in operation 1200, the incremental extraction process terminates.

Loading Incremental Information

When XSM 20 is done extracting the incremental information in operation 1180, it sends a message to applications 70 and 80 that have registered as Xref users that a new incremental file 52 is now available. The applications 70 and 80 then load the new incremental file 52 and the corresponding index file 54 into shared memory 150. This is done automatically without user input by the present invention.

Figure 7:
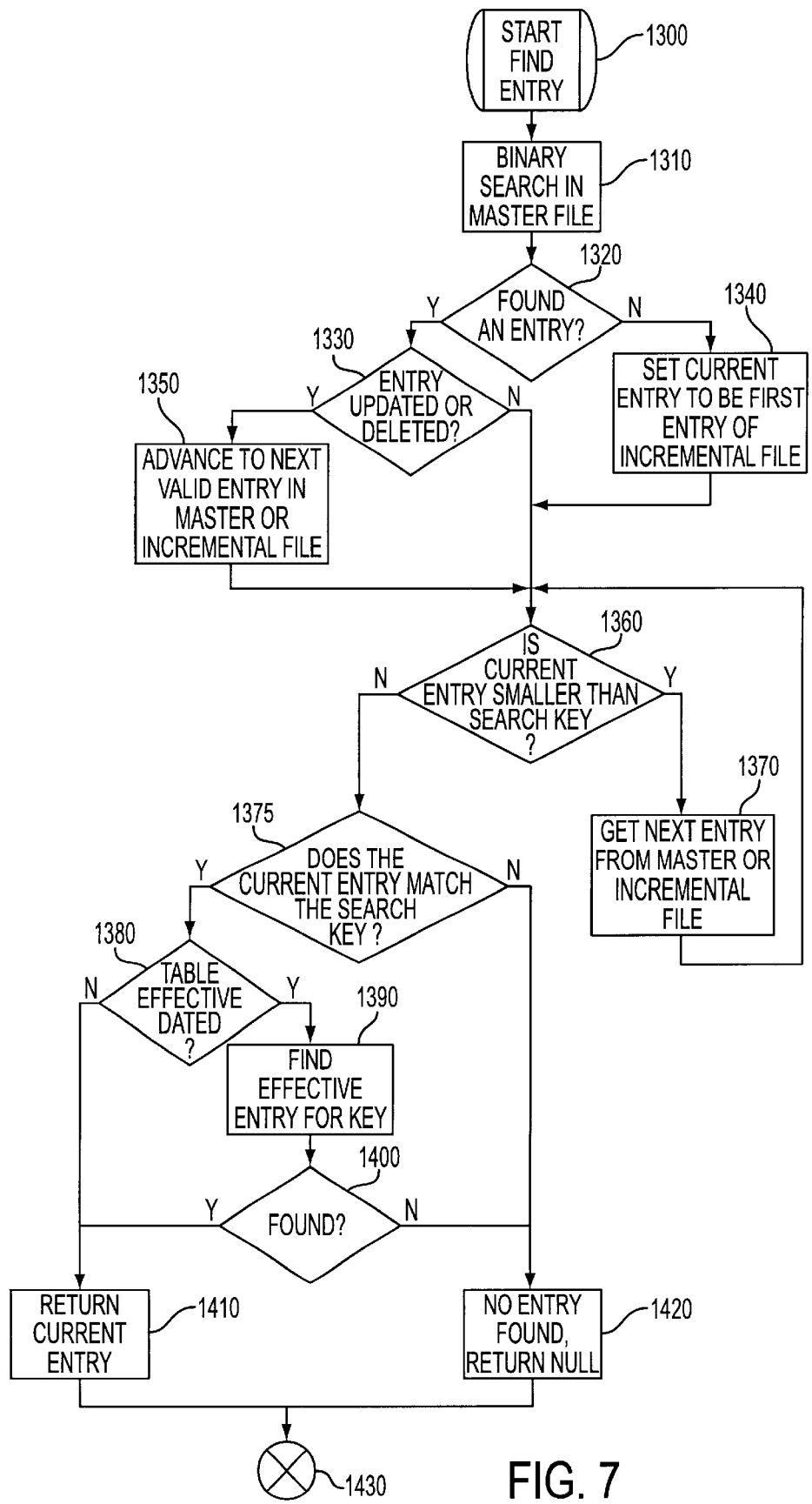
FIG. 7 is a flowchart of the algorithm used to access incremental extractions in the present invention.

FIG. 7 is a flowchart of the algorithm used to access incremental extractions in the present invention. The algorithm shown in FIG. 7 is executed by the Xref Interface 40, shown in FIG. 3, and is activated when an application uses the Xref Interface 40 to look up data entries. It is transparent to applications 70 and 80 whether the data returned is stored in the master file 56 or incremental file 52. The algorithm accepts a full primary key or partial primary key as a search parameter.

Referring to FIG. 7, Xref Interface 40 is activated to find an entry in operation 1300. The Xref interface is provided with a search key to perform the operation. Xref Interface 40 starts by performing a binary search for the search key in the master file 56 in operation 1310. In operation 1310, if no exact match is found, the binary search returns the closest matching entry with a key value smaller than the search key. If the binary search operation 1310 determines that several matching entries exist, the first one is returned. In operation 1320, if the search key is smaller than the primary key 561 of the first entry in the master file 56, NULL is returned. If no entry was found by the binary search, then in operation 1340, the first entry of the incremental file 52 is used as the current entry. This is done to handle the case where entries have been inserted with keys smaller than the primary key 561 of the first entry in the master file 56. In operation 1330, if an entry was found by the binary search, it is evaluated using the index file 54 to determine whether the current entry has been updated or deleted. In operation 1350, further detailed in FIG. 9, if the entry has been updated or deleted the Xref interface 40 reads the next record until the next valid entry in the either the incremental file 52 or master file 56 is reached. A valid entry refers to an entry that is up-to-date and has not been updated or deleted. This is also discussed in the description of the skip invalid entries algorithm provided below. In operation 1360, if the primary key of the current entry has a value smaller than the search key, then processing proceeds to operation 1370. In operation 1370, further detailed in FIG. 8, the next logical successor of the current entry is taken from the master file 56 or incremental file 52. This is also discussed in the algorithm to advance to next valid entry described below. In operation 1360 and 1370, processing continues until the key of the current entry has a value greater than or equal to the search key. In operation 1375, Xref interface 40 then compares the primary key 561 of the current entry to determine if it matches the search key. If the two keys do not match, then, in operation 1420, a NULL value is returned and processing terminates in operation 1430. If the keys match, then in operation 1380 Xref interface 40 checks whether the extracted table contains effective dated data. Effective dated data can have multiple entries for the same primary key over time. Only one entry is active at one particular point in time. If the data is effective dated the algorithm has to find the entry active on the processing date. In operation 1410, if the data is not effective dated, the current entry is returned as the search result and processing terminates in operation 1430. If the data is effective dated, Xref interface 40 advances until an entry which is active on the search date is found in operation 1390. If such an entry is found in operation 1400, Xref interface 40 returns the entry in operation 1410. If no entry is found then in operation 1400, then in operation 1420 a NULL value is returned.

Figure 8:
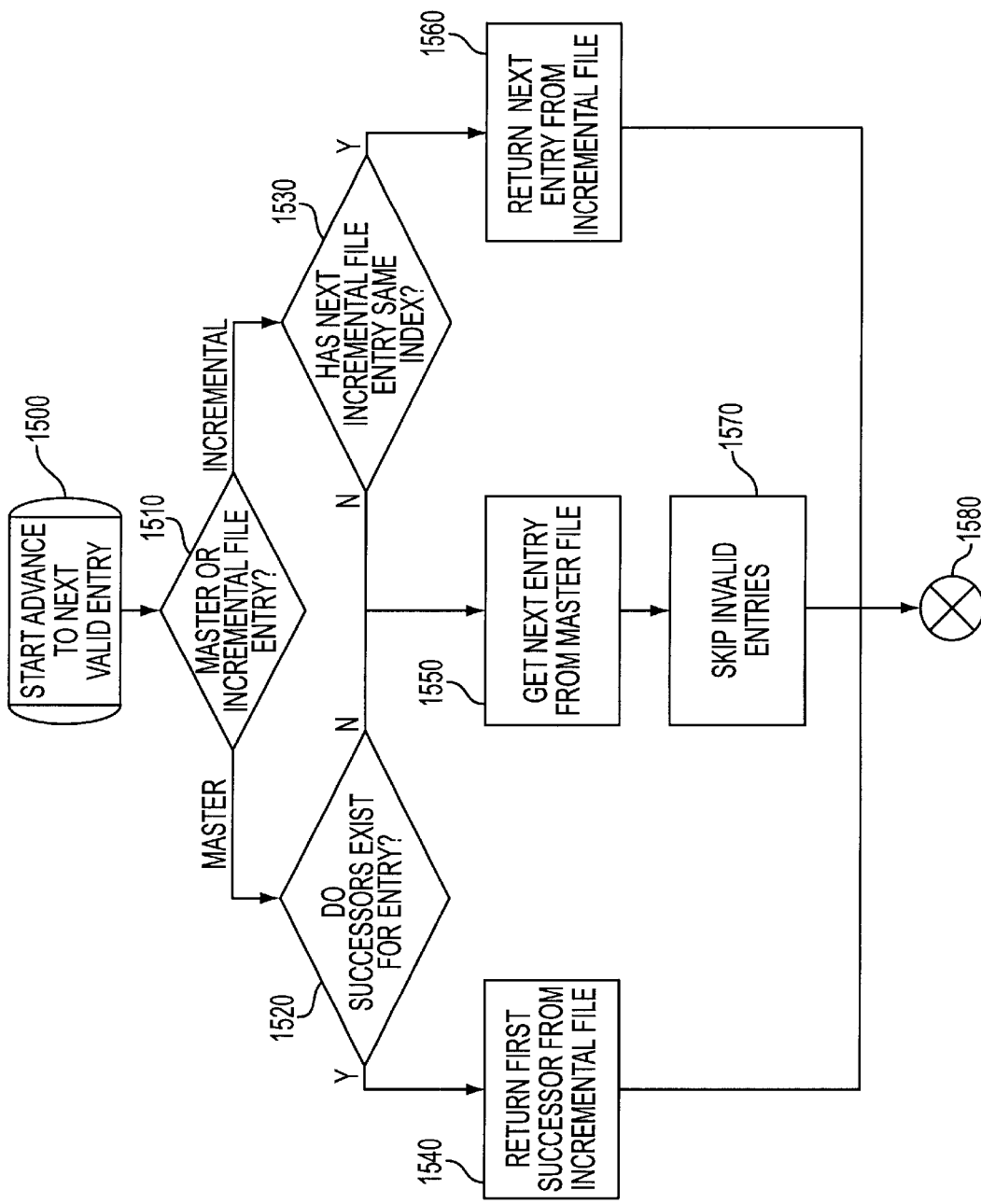
FIG. 8 is a flowchart of the algorithm used to advance to the next valid entry in the present invention.

FIG. 8 is a flowchart of the algorithm used to advance to the next valid entry in the present invention. The algorithm of FIG. 8 takes a master file 56 or incremental file 52 entry as a parameter and returns the next valid entry. Valid entries refer to entries that are up-to-date. Entries that have been updated or deleted are not considered valid entries. A master file 56 entry that has been updated is superceded by an entry in the incremental file and is therefore not valid. The next valid entry can either be located in the master file 56 or the incremental file 52.

FIG. 8 further details operation 1370 shown in FIG. 6. Operation 1500 advances to the next valid entry in master file 56 or incremental file 52. In operation 1510, a determination is made whether the entry is a master file 56 entry or a incremental file 52 entry. If the entry is a master file 56 entry, then, in operation 1520, the index file 52 entry is used to determine whether a successor exist for the entry. If successors exist, then processing returns the first successor from the incremental file 52 in operation 1540. If no successors exist, then the next entry is retrieved from the master file 56, in operation 1550. In operation 1570, invalid entries are skipped, as further discussed below. In operation 1530, if the entry is an incremental file 52 entry, a determination is made whether the next entry in the incremental file 52 has the same predecessor index as the current entry. If the index is not the same, then the next entry from master file 56 is retrieved. Operation 1570 skips invalid entries as further described below. In operation 1560, If the index is the same, the next entry is returned in the incremental file 52.

Figure 9:
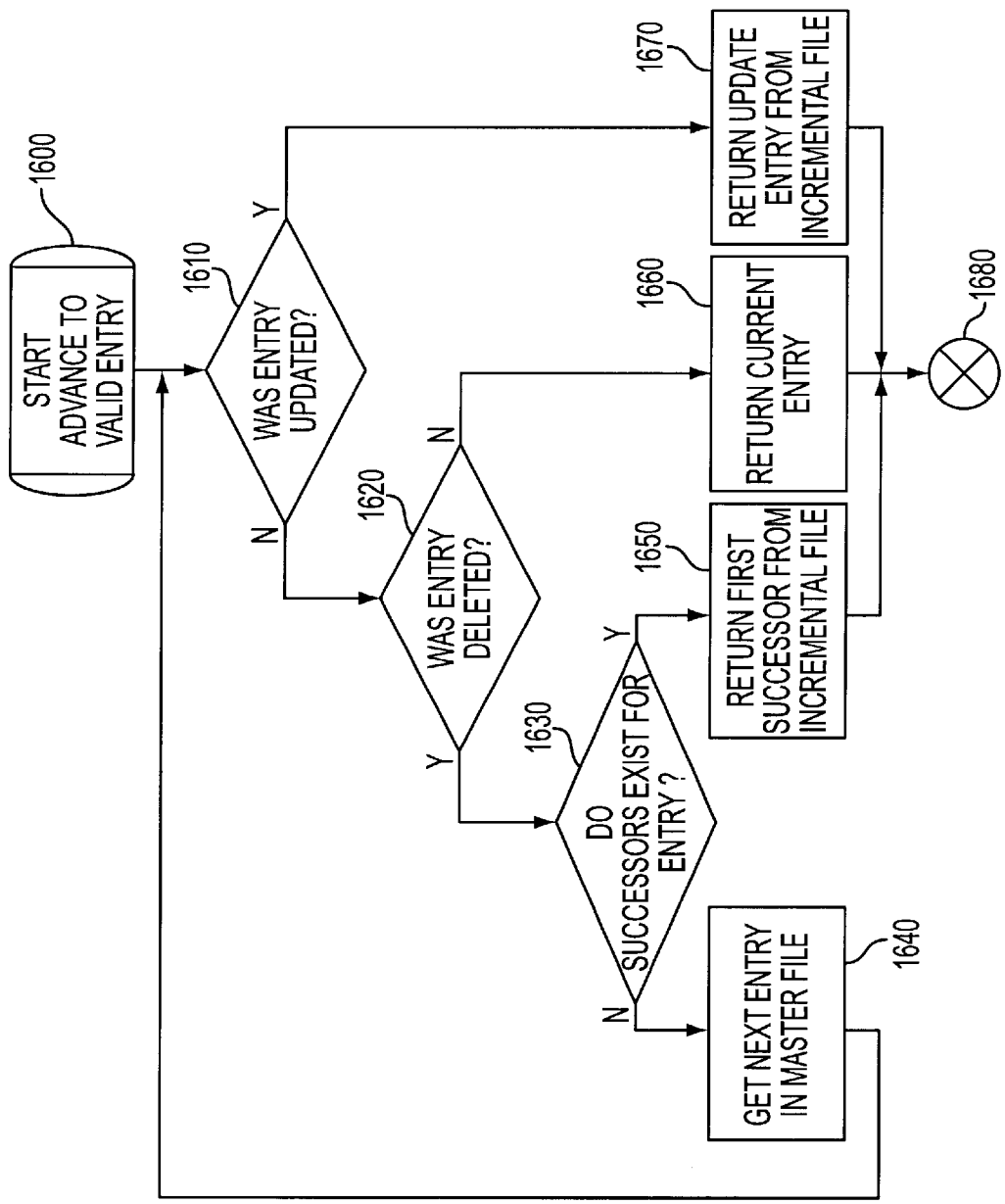
FIG. 9 is a flowchart of the algorithm used to skip invalid entries in the present invention.

FIG. 9 is a flowchart of the algorithm used to skip invalid entries in the present invention and serves to further detail operation 1370 shown in FIG. 6. The flowchart of FIG. 9 further details the operation of operation 1570 shown in FIG. 8 and discussed above. The algorithm shown in FIG. 9 takes a master file 56 entry as a parameter and skips the invalid entries starting at the current entry. Invalid entry refers to an entry that is not up-to-date. Invalid entries have been updated or deleted. A master file 56 entry for which a update exists is not valid or up-to-date. The next valid entry can either be located in the master file 56 or the incremental file 52. If the current entry is a valid entry the algorithm does not skip any entries.

FIG. 9 further details skip processing shown in operation 1350 of FIG. 7 and operation 1570 of FIG. 8. In operation 1610, the index file 54 entry is examined corresponding to the master file 56 entry to determine if the entry has been updated. If an update entry exists, then in operation 1670 the update entry is returned from the incremental file 52. If no update exist, then, in operation 1620, the index file 54 entry is examined to determine if the entry has been deleted. In operation 1660, if the entry has not been deleted, it is a valid entry and is returned by the algorithm. In operation 1630, if the entry was deleted, the index file 54 entry is examined to determine whether successors exist for the entry. This is indicated by the successor field 543 in the index file 54. In operation 1650, if successors exist, the first successor is returned from the incremental file 52. Once either operation 1650, or 1660, or 1670 complete processing, processing terminates in operation 1680. However, if no successors are found to exist in operation 1630, then, in operation 1640, the next entry is retrieved from the master file 56 and continues processing until a valid entry is found. In 1640, if processing reaches the last entry in the master file, NULL is returned.

Alternate Embodiments

The procedures presented herein are not inherently related to any particular computer. In particular, various general-purpose machines may be used with programs described herein. The recommended configuration is a multiprocessor UNIX server. However, any suitable operating system may be used.

Further, any number of computer languages may be used. For example, Java may be used instead of C++. Different versions of UNIX may also be used as well as any comparable operating system. Almost any processor or computer may be used such as a Sun computer.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of accessing a database, comprising:

placing information extracted from the database into a first data structure in a storage device, wherein the first data structure is in a master file and the second data structure is in an incremental file; and updating the information in the storage device periodically or when requested when a change in the information occurs in the database by placing the updated information into a second data structure in the storage device which is linked to the first data structure; and wherein the first data structure and the second data structure are linked by a third data structure, which is in an index file; and wherein the placing information extracted from the database into a first data structure in the storage device comprises:

creating a first system query language statement;

extracting information from the database using the system first query language statement;

sorting the extracted information based on primary key;

placing the sorted information into the master file in the storage device; and sending a message to said plurality of application programs that the master file has been created.

2. A method of accessing a database as recited in claim 1, further comprising:

placing the data contained in the master file, the index file and the incremental file into memory for access by a plurality of application programs.

3. A method of accessing a database as recited in claim 2, further comprising:

updating the information in memory when an incremental extraction is done.

4. A method of accessing a database as recited in claim 3, wherein the updating the information in the storage device periodically or when requested when a change in the information occurs in the database, further comprises:

creating a second system query language statement;

extracting information from the database using the second system query language statement;

extracting update information from a table indicating by key which information of the extracted database information has been updated, added or deleted;

converting the extracted information and the extracted update information into update data structures;

sorting the update data structures by primary key;

comparing the update data structures to the master file;

creating another index file based on the comparison of the update data structures to the master file;

creating another incremental file based on the master file and the index file; and sending a message to said plurality of application programs that another index file and another incremental file have been created.

5. A method of accessing a database as recited in claim 4, wherein the information can be effective dated data and accessed by effective date.

6. A method of accessing a database, comprising:

creating a first system query language statement;

extracting information from the database using the system first query language statement;

sorting the extracted information based on primary key;

placing the sorted information into a master file in a data storage device;

sending a message to a plurality of application programs that the master file has been created; and updating the information in the data storage device periodically or when requested when a change in the information occurs in the database, comprising:

creating a second system query language statement;

extracting information from the database using the second system query language statement;

extracting update information from a table indicating by key which information of the extracted database information has been updated, added or deleted;

converting the extracted information and the extracted update information into update data structures;

sorting the update data structures by primary key;

comparing the update data structures to the master file;

creating another index file based on the comparison of the update date structures to the master file;

creating another incremental file based on the master file and the index file; and sending a message to said plurality of application programs that another index file and another incremental file have been created.

7. A system to access a database, comprising:

an Xref storage manager to extract on-the-fly information from the database and place the information into a first data structure in a storage device and to update on-the-fly the information in the storage device periodically or when requested when a change in the information occurs in the database by placing the updated information into a second data structure in the data storage device which is linked to the first data structure;

wherein the information extracted from the database is convertible to different data formats and different data values; and wherein the first data structure is in a master file and the second data structure is in an incremental file;

a plurality of application programs;

a Xref Interface to interface with the plurality of application programs and retrieve information stored in the master file and incremental file requested by the plurality of application programs;

wherein the first data structure and the second data structure are linked by a third data structure which is in an index file; and wherein the Xref Storage Manager creates a system query language statement and uses this system query language statement to retrieve the information from the database, wherein the Xref Storage Manager sorts the extracted information based on primary key and places the sorted information into the master file in the storage device, and wherein the Xref Storage Manager sends a message to said plurality of application programs that the master file has been created.

8. A system to access a database as recited in claim 7, wherein the Xref interface places the data contained in the master file, the index file and the incremental file into memory for access by a plurality of application programs.

9. A system to access a database as recited in claim 8, wherein the Xref Interface updates the information in memory when an incremental extraction is done.

10. A system to access a database as recited in claim 9, wherein the Xref Storage Manager updates the information in the storage device periodically or when requested when a change in the information occurs in the database by extracting update information from a table indicating by key which information of the extracted database information has been updated, added or deleted and creating another incremental file, and another index file based on the master file and the update information, and wherein the Xref Storage Manager sends a message to said plurality of application programs that another index file and another incremental file have been created.

11. A system to access a database as recited in claim 10, wherein the information can be effective dated data and accessed by effective date.

12. A computer program embodied on a computer-readable medium to access a database, comprising:

an Xref storage manager code segment to extract information from the database and place the information into a first data structure in a data storage device and to update the information in the data storage device periodically or when requested when a change in the information occurs in the database by placing the updated information into a second data structure in data storage device which is linked to the first data structure, wherein the first data structure is in a master file and the second data structure is in an incremental file; and wherein the information extracted from the database is convertible to different data formats and different data values;

a plurality of application program code segments;

a Xref Interface code segment to interface with the plurality of application programs and retrieve information stored in the master file and incremental file requested by the plurality of application programs;

wherein the first data structure and the second data structure are linked by a third data structure which is in an index file; and wherein the Xref Storage Manager code segment creates a system query language statement and uses this system query language statement to retrieve the information from the data, wherein the Xref Storage Manager code segment sorts the extracted information based on primary key and places the sorted information into the master file, and wherein the Xref Storage Manager code segment sends a message to said plurality of application programs that the master file has been created.

13. A computer program embodied on a computer-readable medium to access a database as recited in claim 12, wherein the Xref interface code segment places the data contained in the master file, the index file and the incremental file into memory for access by a plurality of application programs, and the Xref Interface code segment updates the information in memory when an incremental extraction is done.

14. A computer program embodied on a computer-readable medium to access a database as recited in claim 13, wherein the Xref Storage Manager code segment updates the information in the storage device periodically or on request when a change in the information occurs in the database by extracting update information from a table indicating by key which information of the extracted database information has been updated, added or deleted and creating another incremental file, and another index file based on the master file and the update information, and wherein the Xref Storage Manager code segments sends a message to said plurality of application program code segments that another index file and another incremental file have been created.

15. A computer program embodied on a computer-readable medium to access a database as recited in claim 14, wherein the information can be effective dated data and accessed by effective date.

16. A method of accessing a database, comprising:
placing information extracted from the database into a first data structure in a storage device, wherein said placing comprises
creating a first system query language statement,
extracting information from the database using the system first query language statement,
sorting the extracted information based on primary key,
placing the sorted information into the master file in the storage device, and
sending a message to said plurality of application programs that the master file has been created; and
updating the information in the storage device periodically or when requested when a change in the information occurs in the database by placing the updated information into a second data structure in the storage device which is linked to the first data structure, wherein the first data structure and second data structures are tables, wherein the first data structure is a master file and the second data structure is an incremental file, wherein the first data structure and second data structure are accessible by a plurality of application programs, wherein the first data structure and the second data structure are linked by a third data structure that is an index file.

17. A method of accessing a database as recited in claim 16, further comprising:
placing the data contained in the master file, the index file and the incremental file into memory for access by a plurality of application programs.

18. A method of accessing a database as recited in claim 17, further comprising:
updating the information in memory when an incremental extraction is done.

19. A method of accessing a database as recited in claim 18, wherein the updating the information in the storage device periodically or when requested when a change in the information occurs in the database, further comprises:
creating a second system query language statement;
extracting information from the database using the second system query language statement;
extracting update information from a table indicating by key which information of the extracted database information has been updated, added or deleted;
converting the extracted information and the extracted update information into update data structures;
sorting the update data structures by primary key;
comparing the update data structures to the master file;
creating another index file based on the comparison of the update data structures to the master file;
creating another incremental file based on the master file and the index file; and
sending a message to said plurality of application programs that another index file and another incremental file have been created.

20. A method of accessing a database as recited in claim 19, wherein the information can be effective dated data and accessed by effective date.

21. A method of accessing a database, comprising:
placing information extracted from the database into a first data structure in a storage device, wherein said placing comprises
creating a first system query language statement,
extracting information from the database using the system first query language statement,
sorting the extracted information based on primary key,
placing the sorted information into the master file in the storage device, and
sending a message to said plurality of application programs that the master file has been created; and
updating the information in the storage device periodically or when requested when a change in the information occurs in the database by placing the updated information into a second data structure in the storage device which is linked to the first data structure.

* * * * *

UNITED STATES PATENT AND TRADEMARK OFFICE
CERTIFICATE OF CORRECTION

PATENT NO.    : 6,463,439 B1
DATED         : October 8, 2002
INVENTOR(S)   : Mikael Dahlberg It is certified that error appears in the above-identified patent and that said Letters Patent is hereby corrected as shown below:

<u>Column 3,</u>
Line 45, delete "NF,".

<u>Column 7,</u>
Line 36, delete "a ,".

Signed and Sealed this

Eighteenth Day of March, 2003

JAMES E. ROGAN
*Director of the United States Patent and Trademark Office*